US012780437B2

(12) United States Patent
Al-Nadawi et al.

(10) Patent No.: US 12,780,437 B2
(45) Date of Patent: Nov. 3, 2026

(54) METHOD AND APPARATUS FOR CONTROL OF DYNAMIC SYSTEMS WITH STRINGENT TIME CONSTRAINTS

(71) Applicant: RTX CORPORATION, Farmington, CT (US)

(72) Inventors: Yasir Al-Nadawi, South Windsor, CT (US); Milos Ilak, Hoboken, NJ (US)

(73) Assignee: RTX CORPORATION, Farmington, CT (US)

( * ) Notice: Subject to any disclaimer, the term of this patent is extended or adjusted under 35 U.S.C. 154(b) by 51 days.

(21) Appl. No.: 19/077,606

(22) Filed: Mar. 12, 2025

(65) Prior Publication Data

US 2025/0289579 A1 Sep. 18, 2025

Related U.S. Application Data

(60) Provisional application No. 63/565,298, filed on Mar. 14, 2024.

(51) Int. Cl.
*B64D 31/18* (2024.01)
*B64D 27/33* (2024.01)
(Continued)

(52) U.S. Cl.
CPC ............. *B64D 31/18* (2024.01); *B64D 27/33* (2024.01); *B64D 47/00* (2013.01); (Continued)

(58) Field of Classification Search
CPC ........ B64D 31/18; B64D 27/33; B64D 47/00; B64D 2221/00; H02P 23/0018; H02P 23/12
See application file for complete search history.

(56) References Cited

U.S. PATENT DOCUMENTS 6,823,675 B2 11/2004 Brunell et al.
7,954,579 B2 6/2011 Rodriguez et al.
(Continued)

FOREIGN PATENT DOCUMENTS

CN 113221258 8/2021
CN 114291067 4/2022
(Continued)

OTHER PUBLICATIONS

Event-Triggered Control for Safety-Critical Systems With Unknown Dynamics, Aug. 26, 2022, Xiao (Year: 2022).*
(Continued)

*Primary Examiner* — Angela Y Ortiz
*Assistant Examiner* — Jeffrey R Chalhoub
(74) *Attorney, Agent, or Firm* — Carlson, Gaskey & Olds, P.C.

(57) ABSTRACT

A method includes utilizing a learning model, which has been trained to mimic the nominal control outputs of a model predictive control, to generate a nominal control output for a system that is an aircraft system having one or more system constraints. The method also includes, based on the nominal control output, satisfying each of one or more system constraints, implementing the nominal control output; and, based on the nominal control output not satisfying one of the one or more system constraints, utilizing a safety stability filter that includes a control barrier function (CBF) portion and a control Lyapunov function (CLF) portion to modify the nominal control output and obtain a modified control output, and implementing the modified control output in the aircraft system. A system is also disclosed.

20 Claims, 4 Drawing Sheets

ALGORITHM 1: EVENT-TRIGGERED CONTROL

INPUTS:
- PLANT MEASUREMENTS $(x, x)$
- DESIGNED ADAPTIVE MODEL EQUATIONS
- QUADRATIC PROGRAM (QP) SOLVER
- THRESHOLDS $(w, v, s)$, WHICH ARE THE BOUNDS ON ERRORS STATES, DERIVATIVE OF ERROR STATES, ADAPTIVE MODEL STATES, RESPECTIVELY.

OUTPUTS:
- EVENT TIMES $(t_k)$
- CONTROL INPUTS $(u^*(t_k))$

INITIALIZE:

1. SET $k=1$, $t_k=0$ (WHERE $k$ IS AN ITERATION NUMBER, AND $t_0$ IS AN INITIAL TIME)

PROCEDURE:

2. WHILE CURRENT TIME $(t_k)$ IS LESS THAN TOTAL EXECUTION TIME OF PROGRAM $(T)$:
   a. MEASURE STATE $(x, x)$ FROM THE PLANT AT TIME $t_k$.
   b. UPDATE THE ADAPTIVE MODEL STATE WITH THE PLANT STATE.
   c. DETERMINE THE OBJECTIVE FUNCTION OF THE QP RELATED TO THE SAFETY AND STABILITY CONSTRAINTS (CBF/CLF)
   d. SOLVE THE QP AT TIME $t_k$ TO OBTAIN OPTIMAL CONTROL INPUT $u^*(t_k)$.
   e. APPLY CONTROL INPUT $u^*(t_k)$ TO BOTH PLANT AND MODEL UNTIL NEXT EVENT.
   f. MEASURE STATE $(x, x)$ AGAIN.
   g. DETERMINE NEXT EVENT TIME $(t_{k+1})$ BASED ON ERROR CONDITIONS AND THRESHOLDS.
   h. IF AN ERROR CONDITION IS MET, INCREMENT $k$ AND BREAK THE LOOP.

3. REPEAT UNTIL FINAL TIME $(T)$ IS REACHED.

(51) Int. Cl.
*B64D 47/00* (2006.01)
*H02P 23/00* (2016.01)
*H02P 23/12* (2006.01)

(52) U.S. Cl.
CPC .......... *H02P 23/0018* (2013.01); *H02P 23/12* (2013.01); *B64D 2221/00* (2013.01)

(56) References Cited

U.S. PATENT DOCUMENTS

| | | | |
|---|---|---|---|
| 9,564,757 B2 | 2/2017 | Wang et al. | |
| 11,840,213 B2 | 12/2023 | Bowman et al. | |
| 2004/0123600 A1* | 7/2004 | Brunell ..................... | F02C 9/00 60/773 |
| 2021/0213933 A1 | 7/2021 | Borrelli et al. | |

FOREIGN PATENT DOCUMENTS

| | | |
|---|---|---|
| CN | 113221258 B * | 9/2022 |
| WO | 2008128416 | 10/2008 |

OTHER PUBLICATIONS

U.S. Appl. No. 18/202,688, filed May 26, 2023.
U.S. Appl. No. 18/496,117, filed Oct. 27, 2023.
U.S. Appl. No. 18/478,084, filed Sep. 29, 2023.
Xiao et al., "Event-triggered safety-critical control for systems with unknown dynamics".

* cited by examiner

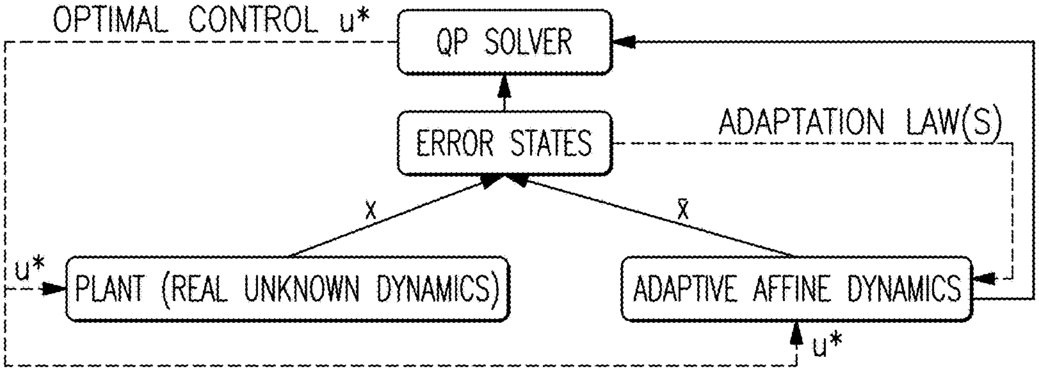

FIG.4

ALGORITHM 1: EVENT-TRIGGERED CONTROL

INPUTS:

- -PLANT MEASUREMENTS $(x,x)$
- -DESIGNED ADAPTIVE MODEL EQUATIONS
- -QUADRATIC PROGRAM (QP) SOLVER
- -THRESHOLDS (w,v,s), WHICH ARE THE BOUNDS ON ERRORS STATES, DERIVATIVE OF ERROR STATES, ADAPTIVE MODEL STATES, RESPECTIVELY.

OUTPUTS:

- -EVENT TIMES $(t_k)$
- -CONTROL INPUTS $(u^*(t_k))$

INITIALIZE:

1. SET $k=1$, $t_k=0$ (WHERE $k$ IS AN ITERATION NUMBER, AND $t_0$ IS AN INITIAL TIME)

PROCEDURE:

2. WHILE CURRENT TIME $(t_k)$ IS LESS THAN TOTAL EXECUTION TIME OF PROGRAM $(T)$:
   a. MEASURE STATE $(x,x)$ FROM THE PLANT AT TIME $t_k$.
   b. UPDATE THE ADAPTIVE MODEL STATE WITH THE PLANT STATE.
   c. DETERMINE THE OBJECTIVE FUNCTION OF THE QP RELATED TO THE SAFETY AND STABILITY CONSTRAINTS (CBF/CLF)
   d. SOLVE THE QP AT TIME $t_k$ TO OBTAIN OPTIMAL CONTROL INPUT $u^*(t_k)$.
   e. APPLY CONTROL INPUT $u^*(t_k)$ TO BOTH PLANT AND MODEL UNTIL NEXT EVENT.
   f. MEASURE STATE $(x,x)$ AGAIN.
   g. DETERMINE NEXT EVENT TIME $(t_{k+1})$ BASED ON ERROR CONDITIONS AND THRESHOLDS.
   h. IF AN ERROR CONDITION IS MET, INCREMENT $k$ AND BREAK THE LOOP.

3. REPEAT UNTIL FINAL TIME $(T)$ IS REACHED.

FIG.5

METHOD AND APPARATUS FOR CONTROL OF DYNAMIC SYSTEMS WITH STRINGENT TIME CONSTRAINTS

CROSS-REFERENCE TO RELATED APPLICATIONS

This application claims priority to U.S. Provisional Application No. 63/565,298 which was filed on Mar. 14, 2024, and is incorporated herein by reference in its entirety.

BACKGROUND

Designing a fast real-time control system for dynamic systems with stringent time constraints, such as the ones used in the advanced power systems controls (e.g., an hybrid-electric propulsion "HEP" and/or bus voltage control for an aircraft) and energy production/management, presents challenges.

One option for controlling a dynamic system is described in "Nonlinear Model Predictive Control" published by Lars Grne and Jrgen Pannek in 2011. Such a traditional nonlinear model predictive control (NMPC) approach, though optimal, may suffer from computational delays, especially when dealing with nonconvex and highly nonlinear problems, rendering the approach unsuitable for real-time applications where decision-making must occur within tight timeframes.

SUMMARY

A method according to an example embodiment of the present disclosure includes utilizing a learning model, which has been trained to mimic the nominal control outputs of a model predictive control, to generate a nominal control output for a system that is an aircraft system having one or more system constraints. The method also includes, based on the nominal control output satisfying each of one or more system constraints, implementing the nominal control output; and, based on the nominal control output not satisfying one of the one or more system constraints, utilizing a safety stability filter that includes a control barrier function (CBF) portion and a control Lyapunov function (CLF) portion to modify the nominal control output and obtain a modified control output, and implementing the modified control output in the aircraft system.

In a further embodiment of the foregoing embodiment, the aircraft system is a hybrid-electric propulsion (HEP) system that includes a gas turbine and at least one electric motor, and the nominal control output includes a power splitting profile that describes a power allocation between the gas turbine and the one or more electric motors of the HEP system.

In a further embodiment of any of the foregoing embodiments, the method includes repeating the utilizing a learning model step to generate a plurality of additional power splitting profiles; and repeating the steps of utilizing a safety stability filter to modify the nominal control output and implementing the modified control output for the plurality of additional power splitting profiles.

In a further embodiment of any of the foregoing embodiments, the method includes utilizing the model predictive control to obtain a plurality of nominal power splitting profiles that each describe respective power allocations between the gas turbine and the one or more electric motors of the HEP system for one or more mission profiles; and utilizing the nominal power splitting profiles to train the learning model.

In a further embodiment of any of the foregoing embodiments, the CBF portion and CLF portion of the safety stability filter are part of a quadratic program of the safety stability filter. The CBF portion of the safety stability filter is configured to ensure that the power splitting profiles are in a safe set. The CLF portion of the safety stability filter is configured to ensure that a control objective of the aircraft system is met.

In a further embodiment of any of the foregoing embodiments, the control objective includes a power trajectory for an aircraft that includes the aircraft system.

In a further embodiment of any of the foregoing embodiments, the utilizing the safety stability filter includes obtaining real time measurements and system dynamics for a current time period; for at least one of a fuel consumption model and a battery state of charge model, updating the model based on aircraft system; and utilizing the quadratic program, which has an objective function, and which is subject to the one or more CBF constraints and one or more CLF constraints, to find an optimal modified control output in view of the one or more CBF constraints and the one or more CLF constraints.

In a further embodiment of any of the foregoing embodiments, the quadratic program is based on affine dynamics of the aircraft system.

In a further embodiment of any of the foregoing embodiments, the one or more system constraints include CBF constraints for at least one of a battery state of charge, an electric power output, and a gas turbine power output.

In a further embodiment of any of the foregoing embodiments, the aircraft system is a bus voltage control system.

A system according to an example embodiment of the present disclosure includes processing circuitry operatively connected to memory, and configured to utilize a learning model, which has been trained to mimic the nominal control outputs of a model predictive control, to generate a nominal control output for an aircraft system that has one or more system constraints. The processing circuitry is configured to, based on the nominal control output satisfying each of one or more system constraints, implement the nominal control output; and, based on the nominal control output not satisfying one of the one or more system constraints, utilize a safety stability filter that includes a control barrier function (CBF) portion and a control Lyapunov function (CLF) portion to modify the nominal control output and obtain a modified control output; and implement the modified control output in the aircraft system.

In a further embodiment of the foregoing embodiment, the aircraft system is a hybrid-electric propulsion (HEP) system that includes a gas turbine and at least one electric motor, and the nominal control output includes a power splitting profile that describes a power allocation between the gas turbine and the one or more electric motors of the HEP system.

In a further embodiment of any of the foregoing embodiments, the processing circuitry is configured to repeat the utilization of the learning model to generate a plurality of additional power splitting profiles. The processing circuitry is configured to repeat the utilization of the safety stability filter to modify the nominal control output and the implementation of the modified control output for the plurality of additional power splitting profiles.

In a further embodiment of any of the foregoing embodiments, the processing circuitry is configured to utilize the model predictive control to obtain a plurality of nominal power splitting profiles that each describe respective power allocations between the gas turbine and the one or more electric motors of the HEP system for one or more mission profiles; and utilize the nominal power splitting profiles to train the learning model.

In a further embodiment of any of the foregoing embodiments, the CBF portion and CLF portion of the safety stability filter are part of a quadratic program of the safety stability filter. The CBF portion of the safety stability filter is configured to ensure that the power splitting profiles are in a safe set. The CLF portion of the safety stability filter is configured to ensure that a control objective of the aircraft system is met.

In a further embodiment of any of the foregoing embodiments, the control objective includes a power trajectory for an aircraft that includes the aircraft system.

In a further embodiment of any of the foregoing embodiments, to utilize the safety stability filter, the processing circuitry is configured to obtain real time measurements and system dynamics for a current time period and, for at least one of a fuel consumption model and a battery state of charge model, update the model based on aircraft system. The processing circuitry is also configured to utilize the quadratic program, which has an objective function, and which is subject to the one or more CBF constraints and one or more CLF constraints, to find an optimal modified control output in view of the one or more CBF constraints and the one or more CLF constraints.

In a further embodiment of any of the foregoing embodiments, the quadratic program is based on affine dynamics of the aircraft system.

In a further embodiment of any of the foregoing embodiments, the one or more system constraints include constraints for at least one of a battery state of charge, an electric power output, and a gas turbine power output.

In a further embodiment of any of the foregoing embodiments, the aircraft system is a bus voltage control system.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 4 schematically illustrates an example framework to solve an event-triggered Control Lyapunov Function-Control Barrier Function in real-time using plant states/real time measurements (x) and adaptive affine system dynamic states $(\overline{x})$.

FIG. 5 illustrates an example algorithm for an event-triggered Control Lyapunov Function-Control Barrier Function.

DETAILED DESCRIPTION

Figure 1:
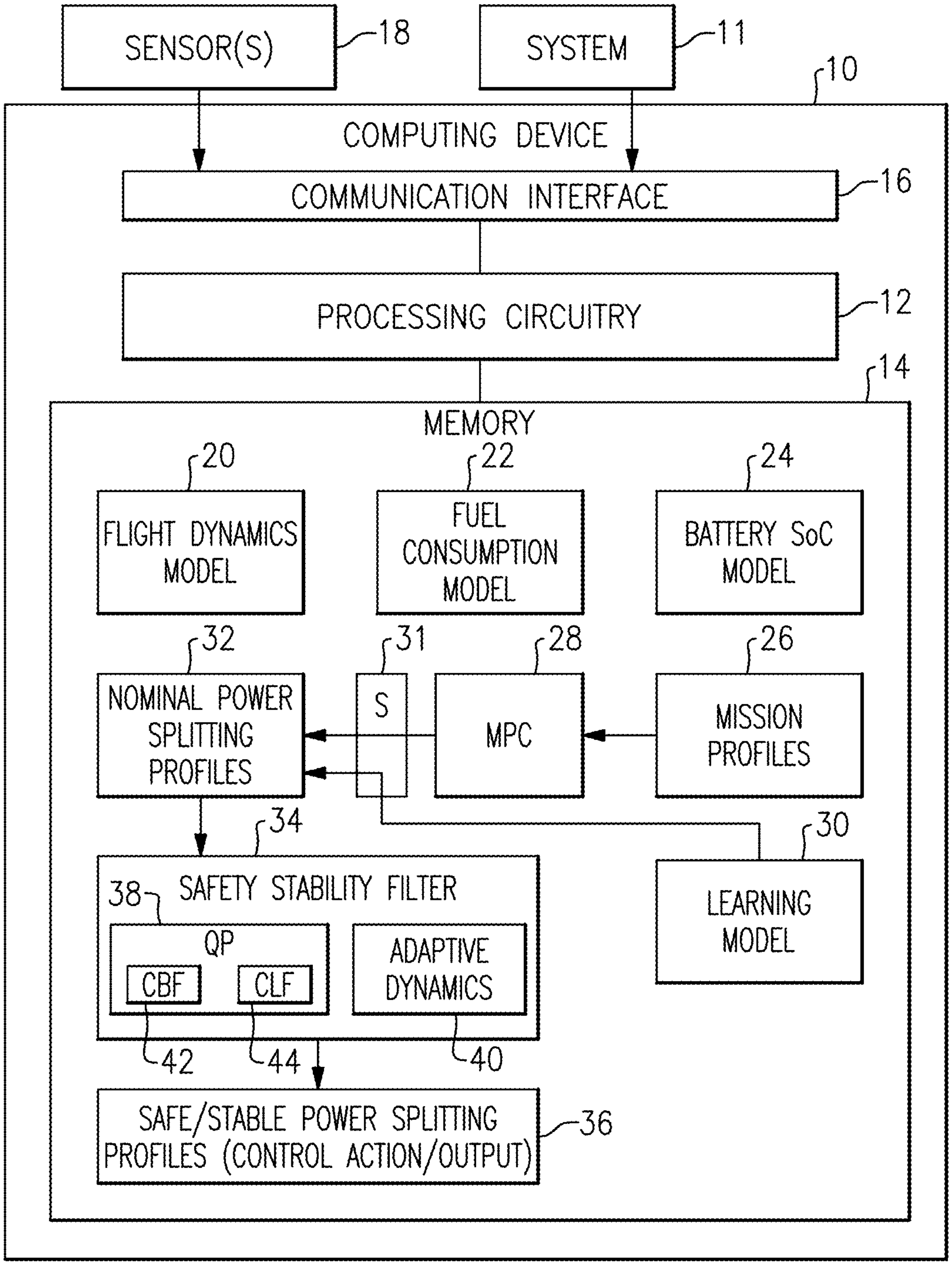
FIG. 1 is a schematic view of an example computing device for controlling a system.

Model predictive control (MPC) approaches, although effective, face significant challenges in real-time implementation due to their computational complexity, especially when dealing with nonlinear optimization problems. One novel approach along these lines, which is set forth in U.S. patent application Ser. No. 18/202,688 (which was filed on May 26, 2023 is incorporated by reference herein in its entirety, and is hereinafter referred to as the '688 Application), integrates neural networks (NNs) with NMPC to approximate the control decision-making process, significantly reducing computational time and ensuring real-time feasibility. An extracted result performed according to the techniques of the '688 Application were found to be faster on average by approximately 1,000 times as compared to a non-NN-based NMPC approach without sacrificing the optimization accuracy (with achieved fuel savings being substantially the same for both approaches).

On the other hand, the event-triggered Control Lyapunov Function-Control Barrier Function (ET-CLF-CBF) approach, described in W. Xiao, C. Belta and C. G. Cassandras, "Event-Triggered Control for Safety-Critical Systems With Unknown Dynamics," in IEEE Transactions on Automatic Control, vol. 68, no. 7, pp. 4143-4158 July 2023 (hereinafter Xiao et al.), presents a method for ensuring safety and stability in control systems with unknown dynamics. By utilizing adaptive affine dynamics updated through real-time sensor measurements, this approach adapts to the system's dynamics, ensuring that safety-critical control requirements are met efficiently and effectively.

The present disclosure proposes a novel approach for a fast, real-time control system capable of handling highly nonlinear and dynamic environments that combines a learning model-based MPC (LM-MPC) with an ET-CLF-CBF. This hybrid approach leverages the speed of learning models for real-time optimization and robustness, and leverages the light computation of a ET-CLF-CBF for providing safety and stability. The MPC may be a linear MPC, non-linear MPC, economic MPC, stochastic MPC, adaptive MPC, or the like, for example.

In the proposed approach, the LM-MPC acts as a fast surrogate model, learning the MPC's decision-making process during offline training. In contrast, the ET-CLF-CBF adaptively updates system dynamics based on real-time data, filtering out unsafe and/or unstable actions before they happen in real-time. As used herein, "safe" actions are those that adhere to the prescribed equality and inequality constraints that are enforced in the optimization program, and "unsafe" actions are those that do not adhere to the constraints. Unlike classical CLF-CBF methods, which are primarily time-driven (i.e., generate a decision at each time step), the ET-CLF-CBF approach is event-based, and is thereby triggered when one or more safety criteria is met (and optionally only when the one or more safety criteria are met). This advantage makes the ET-CLF-CBF very efficient and lightweight in terms of the computational burden, as it is less computationally intensive than a purely time-driven approach.

By providing a method for fast, safe, and efficient real-time control, the techniques discussed herein can significantly improve the operational capabilities of systems within this domain, including advanced propulsion systems and power management in defense and naval platforms. Although the discussion below focuses on the application of energy management of an aircraft hybrid-electric propulsion (HEP) system (such as that described in the '688 Application and U.S. patent application Ser. No. 18/496,117 (filed on Oct. 27, 2023, and incorporated by reference herein in its entirety, and hereinafter "the '117 Application)), it is understood that these are non-limiting examples, and that the techniques discussed herein may be applied to other applications that benefit from optimal control (e.g., aircraft bus voltage control systems, as described in U.S. patent application Ser. No. 18/478,084 (which was filed on Sep. 29, 2023, which is incorporated by reference herein in its entirety, hereinafter the '084 Application), and in particular model predictive control approaches.

Combining these two approaches—fast LM-MPC (baseline control algorithm) (see, e.g., the '688 Application) and ET-CLF-CBF (safety/stability filter) (Xiao et al.)—offers a powerful solution for real-time control problems. The LM-MPC provides a speed-efficient control mechanism by learning the optimal control laws offline and applying them in real-time, thus overcoming the computational challenges of traditional MPC. Meanwhile, the ET-CLF-CBF approach provides for safety and stability of the system through adaptive, event-triggered updates, making the system robust to unknown dynamics and changes in the operational environment.

This combined methodology enhances the control of complex systems, such as those encountered in hybrid-electric propulsion for aircraft, by ensuring both high computational efficiency and adherence to safety and stability requirements.

FIG. 1 is a schematic view of an example computing device 10 configured to implement the approach described above for controlling a system 11 (e.g., a HEP system for an aircraft, as described in the '688 Application and the '117 Application, or a bus voltage system of an aircraft as described in the '084 Application). The computing device 10 includes processing circuitry 12 operatively connected to memory 14 and a communication interface 16.

The processing circuitry 12 may include one or more microprocessors, microcontrollers, application specific integrated circuits (ASICs), or the like, for example. Although the processing circuitry 12 is depicted as being within a single computing device 10, it is understood that it could be distributed across multiple computing devices.

The memory 14 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 14 may incorporate electronic, magnetic, optical, and/or other types of storage media. The memory 14 can also have a distributed architecture, where various components are situated remotely from one another, but can be accessed by the processing circuitry 12.

The communication interface 16 facilitates communication between the computing device 10 and other devices, including one or more sensors 18 configured to take measurements of the system 11, such as a battery state of charge (SoC), fuel level, etc. The communication interface 16 may be configured for wired and/or wireless communication, for example.

The memory 14 includes a flight dynamics model 20, fuel consumption model 22, and battery state of charge model 24. Examples of each of these are described in the '688 Application. The memory 14 also includes a plurality of mission profiles 26 that describe a plurality of actual or intended flights of an aircraft that uses an HEP system (e.g., aircraft heights and velocities, which correspond to subsidiary height profiles and velocity profiles, also described in the '688 Application).

The memory 14 includes a model predictive control (MPC) 28, which may be a linear MPC (e.g., as described in equations 11-18 of the '688 Application) or a non-linear MPC. Example inputs to the MPC are shown in FIG. 6 of the '688 Application, for example.

The processing circuitry 12 utilizes the MPC 28 to generate a plurality of nominal power splitting profiles 32 corresponding to the plurality of mission profiles 26, and the processing circuitry 12 uses the nominal power splitting profiles 32 as training data to train a learning model 30 (e.g., as described in equations 28-29 of the '688 Application, for example). The learning model 30 may be a deep learning model, such as a neural network, recurrent neural network, liquid neural network, long short-term memory (LSTM), scientific machine learning models (physics-informed machine learning models), or the like, for example.

The various power splitting profiles 32 for a given mission profile 26 provide a series of power splits to be used throughout a flight described by the mission profile 26 (see, e.g., FIGS. 3-4 of the '688 Application), to achieve a fuel consumption objective of the mission profile 26. This training is performed during a training phase, which may occur offline when an HEP aircraft is not in flight, for example. Once trained, the learning model 30 can be used instead of the MPC (see, e.g., FIG. 9 of the '688 Application) to generate power splitting profiles based on current conditions of the HEP aircraft. The computing device 10 is able to use a switch (schematically shown with reference numeral 31 in FIG. 1) to switch between using an MPC 28 input and a learning model 30 input.

During the training phase or actual use (post-training), the nominal power splitting profiles 32 are input 32 into a safety stability filter 34, which is configured to adjust the nominal power splitting profiles 32 to create one or more modified power splitting profiles 36 (i.e., safe/stable power splitting profiles, which can also be considered a "control output") based on one or more event-trigger criteria being met, as described in greater detail below.

The safety stability filter 34 includes a quadratic program ("QP") 38 which includes a control barrier function (CBF) portion 42 and a Control Lyapunov Function (CLF) portion 44. The CBF portion 42 is configured to ensure that the power splitting profiles 32 are in a safe set (e.g., as described in the '117 Application). The CLF portion 44 is configured to ensure stable performance of the control system (e.g., closed-loop system) and to ensure that a control objective is being met (e.g., a power trajectory for the HEP aircraft). The control objective is defined based on one or more system requirements. However, and in general, usually the control objective is to derive the controlled system states from their initial values to designated values. Also, this may involve cancelling/replacing undesired dynamic behavior through deliberate control laws design.

Figure 3:
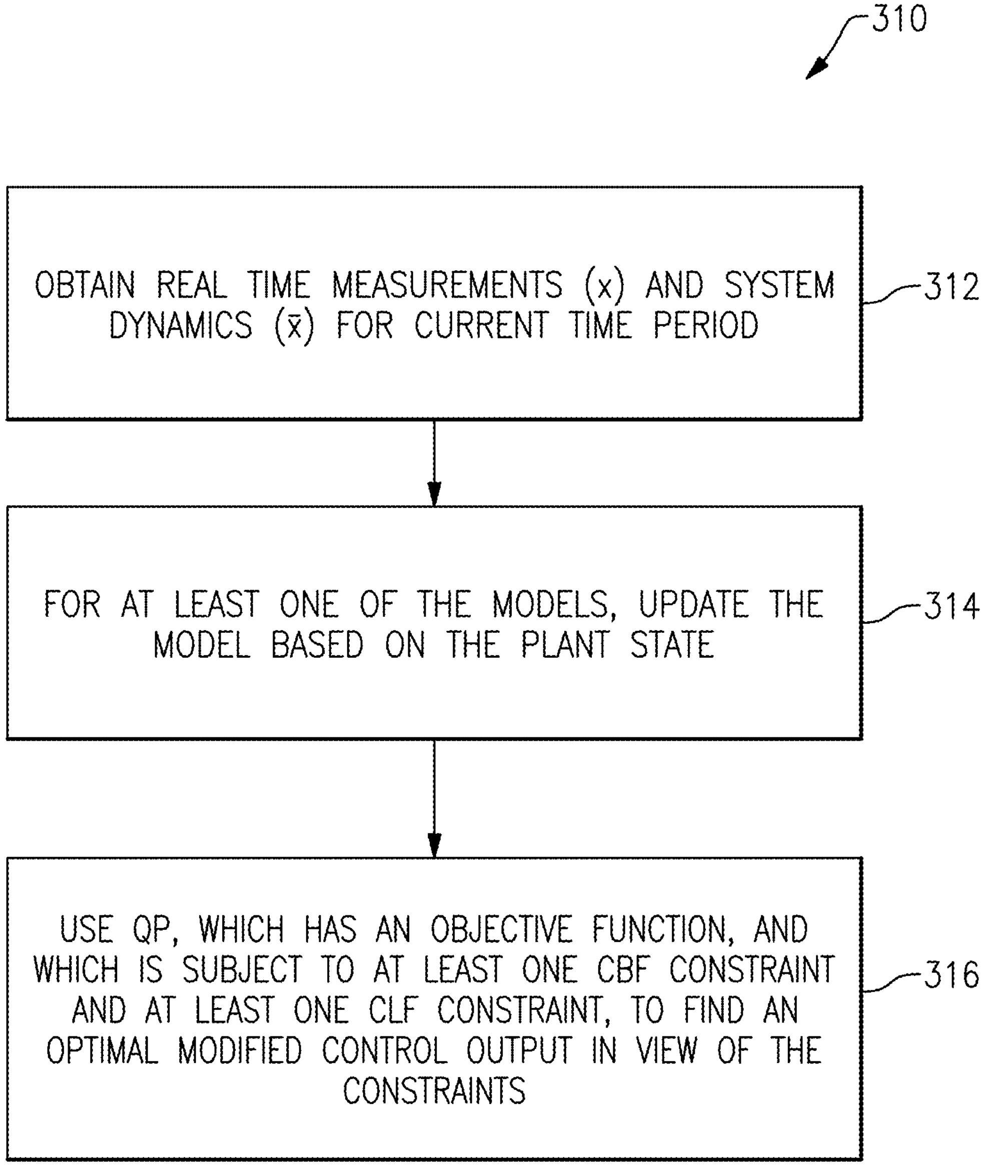
FIG. 3 depicts a flowchart for an example implementation of a step of the method of FIG. 2.

As an example, as shown in FIG. 3 of the '117 Application, a system may have various system constraints relating to things such as total battery state of charge (SoC), gas turbine power output (Pgt) and/or electric motor output (Pem). The CBF portion 42 may be used to ensure that the nominal power splitting profiles 32 do not violate those constraints. The CLF portion 44 may be used to ensure that a separate system control objective is met.

The "dynamics" of a system refer to changes in values over time (e.g., battery state of charge, changes in battery weight (as aircraft batteries may be swapped in/out), and/or changes in aircraft weight (due to fluctuations in passenger weight, cargo weight, etc.)). The adaptive dynamics 40 in FIG. 1 refers to adaptive affine dynamics. As used herein, "affine" means that the control action appears linearly in an adaptive dynamics equation (e.g., equation 10 in Xiao et al.). The system dynamics represent the transient part of the model that represents the plant under consideration for control. The transient behavior is starting from the system initial states until their reaching the steady-state phase. The adaptive affine dynamics is an approximation of the plant model. However, this approximation represents initially a nominal candidate of what could be the model. In case, for example, there are any perturbations related to unsafe/unstable behavior that were not considered in the nominal model, the adaptation law is part of the adaptive affine dynamics will update the adaptive affine dynamics to match it with the actual plant dynamics. An example of the dynamics of a HEP system may include fuel mass rate of change and/or battery state of charge rate of change.

Figure 2:
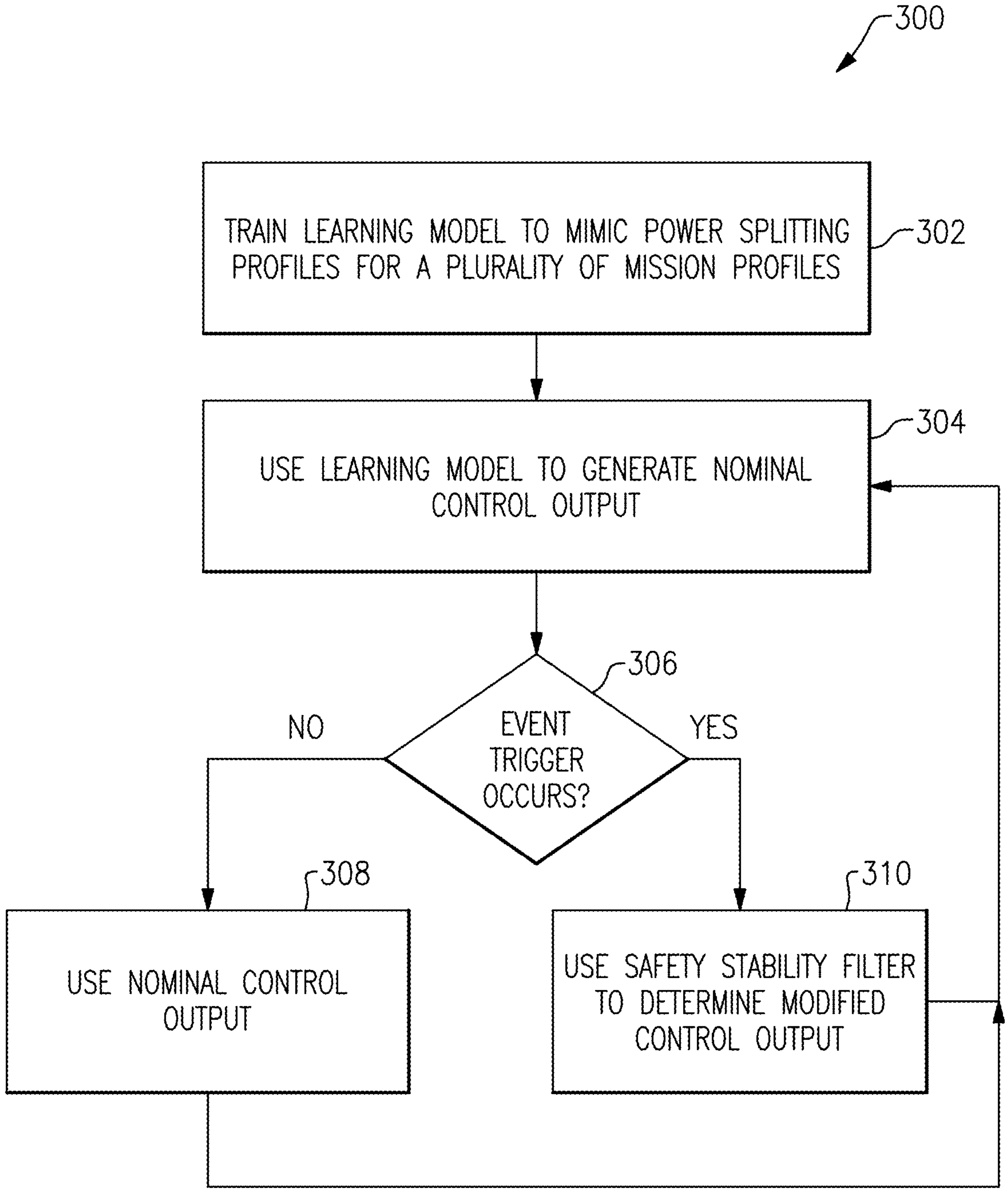
FIG. 2 is a flowchart of an example control method.

FIG. 2 is a flowchart of an example control method 300 for controlling the system 11. During a training phase, which may be performed offline (i.e., outside of an actual flight mission), learning model 30 is trained (step 302) to mimic the power splitting profiles 32 output by the MPC 28 (e.g., using at least steps 102 and 104 from FIG. 10 of the '688 Application).

Once trained, the computing device 10 uses the learning model 30 to generate nominal control outputs (u), such as the nominal power splitting profiles 32 (step 304), as described in FIG. 9 of the '688 Application. The computing device 10 monitors for occurrence of an event trigger (step 306). The one or more event triggers correspond to one of the system bounds/constraints (such as those described above in FIG. 3 of the '688 Application and/or in relation to the events described in connection with equation 27 of Xiao et al.) not being satisfied.

If no event trigger occurs (a "no" to step 306), indicating that the system 11 constraints are being satisfied, the computing device 10 uses the unmodified control outputs (step 308) (the nominal power splitting profiles 32).

If one or more event triggers occur (a "yes" to step 306), the computing device 10 uses the safety stability filter 34 to modify the nominal control output (step 310) (i.e., modify the nominal power splitting profiles 32), and the method proceeds back to step 304.

FIG. 3 depicts a flowchart of an example implementation of step 310 of the method 300 of FIG. 2. The computing device 10 obtains real time measurements (x) and adaptive affine system dynamics states ($\bar{x}$) for a current time period (step 312). For at least one of the models 22, 24, the computing device 10 updates the model based on the actual measurement of the plant state (x) (i.e., state of the adaptive affine system 40) (step 314).

The computing device 10 uses the quadratic program 38, which has an objective function, and which is subject to at least one CBF constraint (associated with CBF portion 42) and at least one CLF constraint (associated with CLF 44), to find a modified and improved (e.g., optimal, or at least suboptimal) control output (u*) in view of the constraints (step 316). The CBF and CLF constraints follow the common forms of inequalities 6 and 7 of Xiao et al., respectively. However, the safety constraints will be converted to the form of CBF constraints to be incorporated in the quadratic program 38.

Further example representations of step 310 are provided in FIG. 4 and in FIG. 5. Referring to FIG. 5, in the "inputs" section, an example quadratic program solver is provided in equation 16 of the '084 Application, and the variables w, v, and s are also described in the '084 Application.

The integration of the LM-MPC and the ET-CLF-CBF approaches heralds a significant advancement in the domain of real-time control systems. This novel framework is well-suited to address the intricate challenges of ensuring rapid, efficient, and reliable control decision-making, especially in systems characterized by high nonlinearity and dynamic changes. Further details of the combined approach are described below.

Fast LM-MPC Design and Training

The fast LM-MPC approach primarily focuses on approximating the traditional MPC's optimization problem-solving capabilities with learning models (LMs), enabling real-time execution even in computationally constrained environments. This may involve several steps to reach the design:

- Design of a Classical MPC Algorithm: Initiate with designing an unconstrained (or constrained, based on the application specifics) classical MPC algorithm using a prediction model, which is accurate enough for the system under consideration.
- Monte Carlo Simulations for Data Collection: Perform extensive Monte Carlo simulations across thousands of experiments to collect data related to the MPC function, capturing both its inputs and outputs.
- Learning Model Training: Utilize the collected data to train a learning model, aiming to closely mimic the MPC's performance.
- Validation of the Trained Model: Ensure the LM model's generalization capability by validating it against unseen data, covering various scenarios, initial conditions, and model parameter variations.
- Performance Comparison: Evaluate and compare the computational performance between the classical MPC and the newly designed LM-MPC controllers.

This process, demonstrates the potential of LMs to significantly reduce the computational demands of MPC controllers while maintaining or enhancing their control accuracy and efficiency.

Online Adaptation of ET-CLF-CBF for Stability and Safety

Focusing on Xiao et al., the ET-CLF-CBF approach introduces an adaptive mechanism for real-time control that ensures system stability and safety through dynamic updates based on real-world measurements. The methodology encompasses:

- Problem Formulation: Define the control problem with a focus on stability and safety within the operational dynamics of the system.
- Dynamics Adaptation: Utilize adaptive affine dynamics, as depicted in, e.g., FIG. 4, which are updated through event-triggered mechanisms to match the real, measured dynamics of the system closely.
- Event-triggered Control: Implement control strategies that are activated upon specific events rather than at fixed time intervals, enhancing computational efficiency and responsiveness.
- Algorithmic Implementation: Follow the pseudo-code provided in Algorithm 1 (FIG. 5, which is a simplified version of the approach described in the '084 Application for easy readability) to implement the ET-CLF-CBF approach, ensuring that the system's control actions are both safe and stable under all operational conditions.

The combination of these methodologies-initially designing and deploying a fast LM-MPC controller, followed by integrating an ET-CLF-CBF stability/safety filter, and finally testing and confirming performance on benchmark case-study applications-provides a comprehensive framework for the rapid enforcement of safety and stability in complex control systems. This dual-layered approach ensures not only the efficient management of dynamic operational scenarios but also robust safety and stability, making it a pivotal innovation in the field of control systems engineering.

Example Applications

The techniques discussed herein can be used for a wide variety of dynamic systems, such as advanced power systems (e.g., aircraft bus voltage control systems, as discussed in the '084 Application), communications systems, command and control systems, intelligence systems, surveillance systems, reconnaissance systems, computing, network systems, and autonomous systems.

Although a hybrid-electric propulsion system is discussed in the '688 Application and the '117 Application, it is understood that this is a non-limiting example of a dynamic system. In the case of a bus voltage control system, for example, the techniques discussed herein (which combine fast learning model-based MPC, and event-triggered CLF-CBF) can maintain stable and efficient power systems in critical infrastructure.

Challenges and Mitigation Strategies

The integration of MPC within the Control Lyapunov Function (CLF) and Control Barrier Function (CBF) frameworks, especially under the event-triggered control paradigm for systems with partially or completely unknown dynamics, is a novel approach. MPC, which is proficient in handling system nonlinearities and forecasting future states, aligns well with the objectives of achieving desired performance while adhering to predefined constraints. Incorporating it into the CLF-CBF framework would benefit from ensuring that MPC-generated control actions are in harmony with the safety and stability constraints delineated by CBFs and CLFs.

The MPC may be tailored to respect the constraints imposed by the proposed CLF-CBF framework, possibly involving modifications to its formulation to align with the event-triggered mechanism's operational logic, in order to ensure that the MPC's nominal control inputs do not undermine the safety assurances provided by CBFs. This allows for maintaining the computational efficiency and safety guarantees intrinsic to the event-triggered control scheme.

By ensuring both the computational efficiency and safety of control systems, the present disclosure may be used to directly contribute to enhancing the performance and reliability of critical defense and civilian technological systems.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method, comprising:

utilizing a learning model, which has been trained to mimic the nominal control outputs of a model predictive control, to generate a nominal control output for a system that is an aircraft system having one or more system constraints;

based on the nominal control output satisfying each of one or more system constraints, implementing the nominal control output; and based on the nominal control output not satisfying one of the one or more system constraints:

utilizing a safety stability filter that includes a control barrier function (CBF) portion and a control Lyapunov function (CLF) portion to modify the nominal control output and obtain a modified control output; and implementing the modified control output in the aircraft system.

2. The method of claim 1, wherein:

the aircraft system is a hybrid-electric propulsion (HEP) system that includes a gas turbine and at least one electric motor; and the nominal control output comprises a power splitting profile that describes a power allocation between the gas turbine and the one or more electric motors of the HEP system.

3. The method of claim 2, comprising:

repeating said utilizing a learning model step to generate a plurality of additional power splitting profiles; and repeating said steps of utilizing a safety stability filter to modify the nominal control output and implementing the modified control output for the plurality of additional power splitting profiles.

4. The method of claim 2, comprising:

utilizing the model predictive control to obtain a plurality of nominal power splitting profiles that each describe respective power allocations between the gas turbine and the one or more electric motors of the HEP system for one or more mission profiles; and utilizing the nominal power splitting profiles to train the learning model.

5. The method of claim 2, wherein:

the CBF portion and CLF portion of the safety stability filter are part of a quadratic program of the safety stability filter;

the CBF portion of the safety stability filter is configured to ensure that the power splitting profiles are in a safe set; and the CLF portion of the safety stability filter is configured to ensure that a control objective of the aircraft system is met.

6. The method of claim 5, the control objective comprises a power trajectory for an aircraft that includes the aircraft system.

7. The method of claim 5, wherein said utilizing the safety stability filter comprises:

obtaining real time measurements and system dynamics for a current time period;

for at least one of a fuel consumption model and a battery state of charge model, updating the model based on aircraft system; and utilizing the quadratic program, which has an objective function, and which is subject to the one or more CBF constraints and one or more CLF constraints, to find an optimal modified control output in view of the one or more CBF constraints and the one or more CLF constraints.

8. The method of claim 7, wherein the quadratic program is based on affine dynamics of the aircraft system.

9. The method of claim 7, wherein:

the one or more system constraints include CBF constraints for at least one of a battery state of charge, an electric power output, and a gas turbine power output.

10. The method of claim 1, wherein the aircraft system is a bus voltage control system.

11. A system, comprising:

processing circuitry operatively connected to memory, and configured to:

utilize a learning model, which has been trained to mimic the nominal control outputs of a model predictive control, to generate a nominal control output for an aircraft system that has one or more system constraints;

based on the nominal control output satisfying each of one or more system constraints, implement the nominal control output; and based on the nominal control output not satisfying one of the one or more system constraints:

utilize a safety stability filter that includes a control barrier function (CBF) portion and a control Lyapunov function (CLF) portion to modify the nominal control output and obtain a modified control output; and implement the modified control output in the aircraft system.

12. The system of claim 11, wherein:

the aircraft system is a hybrid-electric propulsion (HEP) system that includes a gas turbine and at least one electric motor; and the nominal control output comprises a power splitting profile that describes a power allocation between the gas turbine and the one or more electric motors of the HEP system.

13. The system of claim 12, wherein the processing circuitry is configured to:

repeat the utilization of the learning model to generate a plurality of additional power splitting profiles; and repeat the utilization of the safety stability filter to modify the nominal control output and the implementation of the modified control output for the plurality of additional power splitting profiles.

14. The system of claim 12, wherein the processing circuitry is configured to:

utilize the model predictive control to obtain a plurality of nominal power splitting profiles that each describe respective power allocations between the gas turbine and the one or more electric motors of the HEP system for one or more mission profiles; and utilize the nominal power splitting profiles to train the learning model.

15. The system of claim 12, wherein:

the CBF portion and CLF portion of the safety stability filter are part of a quadratic program of the safety stability filter;

the CBF portion of the safety stability filter is configured to ensure that the power splitting profiles are in a safe set; and the CLF portion of the safety stability filter is configured to ensure that a control objective of the aircraft system is met.

16. The system of claim 15, the control objective comprises a power trajectory for an aircraft that includes the aircraft system.

17. The system of claim 15, wherein to utilize the safety stability filter, the processing circuitry is configured to:

obtain real time measurements and system dynamics for a current time period;

for at least one of a fuel consumption model and a battery state of charge model, update the model based on aircraft system; and utilize the quadratic program, which has an objective function, and which is subject to the one or more CBF constraints and one or more CLF constraints, to find an optimal modified control output in view of the one or more CBF constraints and the one or more CLF constraints.

18. The system of claim 17, wherein the quadratic program is based on affine dynamics of the aircraft system.

19. The system of claim 16, wherein:

the one or more system constraints include constraints for at least one of a battery state of charge, an electric power output, and a gas turbine power output.

20. The system of claim 11, wherein the aircraft system is a bus voltage control system.

* * * * *